US012565194B2

(12) United States Patent
Yokouchi

(10) Patent No.: US 12,565,194 B2
(45) Date of Patent: Mar. 3, 2026

(54) PARKING ASSISTANCE APPARATUS AND PARKING ASSISTANCE METHOD

(71) Applicant: Panasonic Intellectual Property Management Co., Ltd., Osaka (JP)

(72) Inventor: Yasuo Yokouchi, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 428 days.

(21) Appl. No.: 18/370,027

(22) Filed: Sep. 19, 2023

(65) Prior Publication Data

US 2024/0092348 A1 Mar. 21, 2024

(30) Foreign Application Priority Data

Sep. 21, 2022 (JP) ................................. 2022-150166

(51) Int. Cl.
*B60W 30/06* (2006.01)
*G01C 21/34* (2006.01)
(52) U.S. Cl.
CPC ......... *B60W 30/06* (2013.01); *G01C 21/3415* (2013.01); *G01C 21/3476* (2013.01)
(58) Field of Classification Search
None
See application file for complete search history.

(56) References Cited

U.S. PATENT DOCUMENTS

| | | | |
|---|---|---|---|
| 2013/0085637 A1 | 4/2013 | Grimm et al. | |
| 2019/0184981 A1* | 6/2019 | Jung ..................... B60W 30/06 |
| 2023/0159020 A1* | 5/2023 | Bhadgaonkar ..... B62D 15/0285 |
| | | | 701/26 |

FOREIGN PATENT DOCUMENTS

| | | | |
|---|---|---|---|
| JP | 6022447 B2 | 11/2016 | |
| JP | 2020075655 A * | 5/2020 | ............ B60W 50/08 |

OTHER PUBLICATIONS

Machine translation of JP-2020075655-A (Year: 2020).*

* cited by examiner

*Primary Examiner* — Anne Marie Antonucci
*Assistant Examiner* — Kyle S Park
(74) *Attorney, Agent, or Firm* — Greenblum & Bernstein, P.L.C.

(57) ABSTRACT

Provided is a parking assistance apparatus that performs parking assistance based on a route of a vehicle in training traveling. The parking assistance apparatus includes a processor that causes the training traveling to be resumed from a predetermined position on a first route in the training traveling. The processor determines, as a training route, a route including a route before the predetermined position on the first route and a second route in the training traveling having been resumed.

14 Claims, 11 Drawing Sheets

1

PARKING ASSISTANCE APPARATUS AND PARKING ASSISTANCE METHOD

TECHNICAL FIELD

The present disclosure relates to a parking assistance apparatus and a parking assistance method.

BACKGROUND ART

As one parking assistance for a vehicle, there is known a technique of storing a traveling route based on training traveling by a driver and performing parking assistance of automatic parking based on the stored traveling route (for example, see Patent Literature (hereinafter referred to as "PTL") 1).

CITATION LIST

Patent Literature

PTL 1
  Japanese Patent No. 6022447

SUMMARY OF INVENTION

Technical Problem

Solution to Problem

A parking assistance apparatus according to the present disclosure is a parking assistance apparatus that performs parking assistance based on a route of a vehicle in training traveling. The parking assistance apparatus includes a processor that causes the training traveling to be resumed from a predetermined position on a first route in the training traveling. The processor determines, as a training route, a route including a route before the predetermined position on the first route and a second route in the training traveling having been resumed.

A parking assistance method according to the present disclosure is a parking assistance method in which parking assistance is performed based on a route of a vehicle in training traveling. The parking assistance method includes: resuming the training traveling from a predetermined position on a first route in the training traveling; and determining, as a training route, a route including a route before the predetermined position on the first route and a second route in the training traveling having been resumed.

Advantageous Effects of Invention

According to the present disclosure, it is possible to improve convenience in parking assistance.

DESCRIPTION OF EMBODIMENTS

Embodiment

Figure 1:
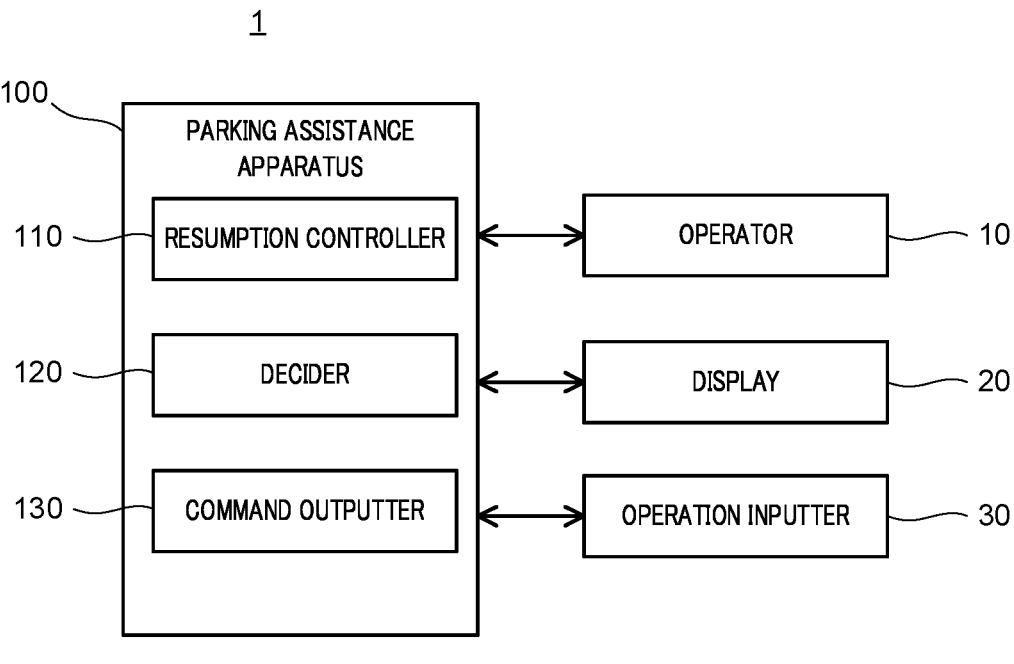
FIG. 1 is a block diagram illustrating a configuration example of a vehicle to which a parking assistance apparatus according to an embodiment of the present disclosure is applied.

Hereinafter, an embodiment of the present disclosure will be described with reference to the drawings. FIG. 1 is a block diagram illustrating a configuration example of vehicle 1 to which parking assistance apparatus 100 according to an embodiment of the present disclosure is applied.

As illustrated in FIG. 1, vehicle 1 has the function of automatic parking assistance to perform automatic parking in a predetermined parking space, and includes operator 10, display 20, operation inputter 30, and parking assistance apparatus 100.

Operator 10 includes a steering wheel, a gas pedal, a brake pedal, and the like for the driver (user) to operate vehicle 1. The driving operation of vehicle 1 is an operation related to the driving of vehicle 1, such as a steering operation of vehicle 1, a gas pedal operation of vehicle 1, and a brake operation of vehicle 1, for example.

Display 20 is, for example, a display medium such as automotive navigation apparatus. Display 20 displays, for example, a predicted path line for vehicle 1, information on a command outputted by parking assistance apparatus 100, or the like, when the user performs training traveling for automatic parking.

Operation inputter 30 is used for the user to input an operation in response to a command outputted by parking assistance apparatus 100. Operation inputter 30 may be any operation inputter such as, for example, an operation button of an automotive navigation apparatus or the like, and a jog dial provided in vehicle 1. Further, a touch screen in which display 20 and operation inputter 30 are combined may also be used.

Parking assistance apparatus 100 includes a central processing unit (CPU) (not illustrated), a read only memory (ROM) (not illustrated), a random access memory (RAM) (not illustrated), and input-output circuitry (not illustrated), and performs automatic parking control such that automatic parking is performed in a predetermined parking space. Specifically, parking assistance apparatus 100 stores, as training traveling data, a route when parking is performed in a predetermined parking space by a driving operation of the user, and an operation of operator 10 by the user. Then, vehicle 1 performs control such that automatic parking is performed (automatic parking control) based on the training traveling data when parking is performed next time in the predetermined parking space.

In the present embodiment, parking assistance apparatus 100 executes control for partially modifying a training route in training traveling (first route) in addition to the automatic parking control. Parking assistance apparatus 100 includes resumption controller 110, decider 120, and command outputter 130.

Resumption controller 110 causes training traveling to be resumed from a predetermined position on the first route. Specifically, resumption controller 110 controls traveling of vehicle 1 such that vehicle 1 on the first route automatically returns to the predetermined position.

The first route is, for example, a traveling route stored as a training route in training traveling or a traveling route during training traveling between a start position and a position at which the training traveling is stopped or interrupted.

Figure 2:
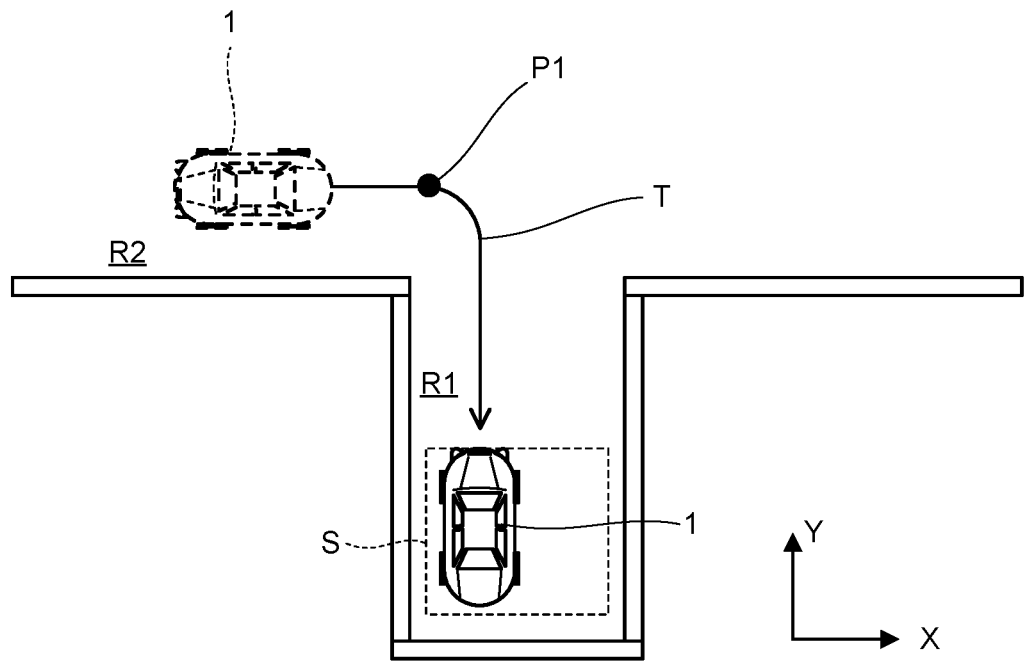
FIG. 2 illustrates an example of a training route.

FIG. 2 illustrates an example of a training route. Note that, in the description of FIG. 2 or the like, an orthogonal coordinate system (X, Y) is used. The drawings to be described later are also illustrated with a common orthogonal coordinate system (X, Y). For example, the X direction indicates the left-right direction with respect to a parking space, and the Y direction indicates the front-rear direction with respect to the parking space. Further, although an entry method using the pattern described above will be exemplified in the following description, the present disclosure is not limited thereto, and the entry method may use any other pattern. Further, although the parking space illustrated in FIG. 2 will be exemplified in the following description, the present disclosure is not limited thereto, and a parking space other than the parking space illustrated in FIG. 2 may also be used.

For example, it is assumed as illustrated in FIG. 2 that there is parking space S located in the end part of road R1, which extends in the Y direction, on the − side in the Y direction. Road R1 extending in the Y direction intersects road R2 extending in the X direction. For example, it is assumed that a position of road R2, which extends in the X direction, on the − side in the X direction with respect to road R1 extending in the Y direction is the start position of training traveling. In this case, for example, vehicle 1 turns, while moving from the start position to the + side in the X direction, toward the − side in the Y direction to thereby travel into road R1, moves as is to the − side in the Y direction, and enters parking space S.

Further, the predetermined position is an arbitrary position on the first route. For example, in a case where the traveling route of arrow T (first route) along the shape of the road is taken in training traveling, the predetermined position is an arbitrary position on arrow T.

Figure 3:
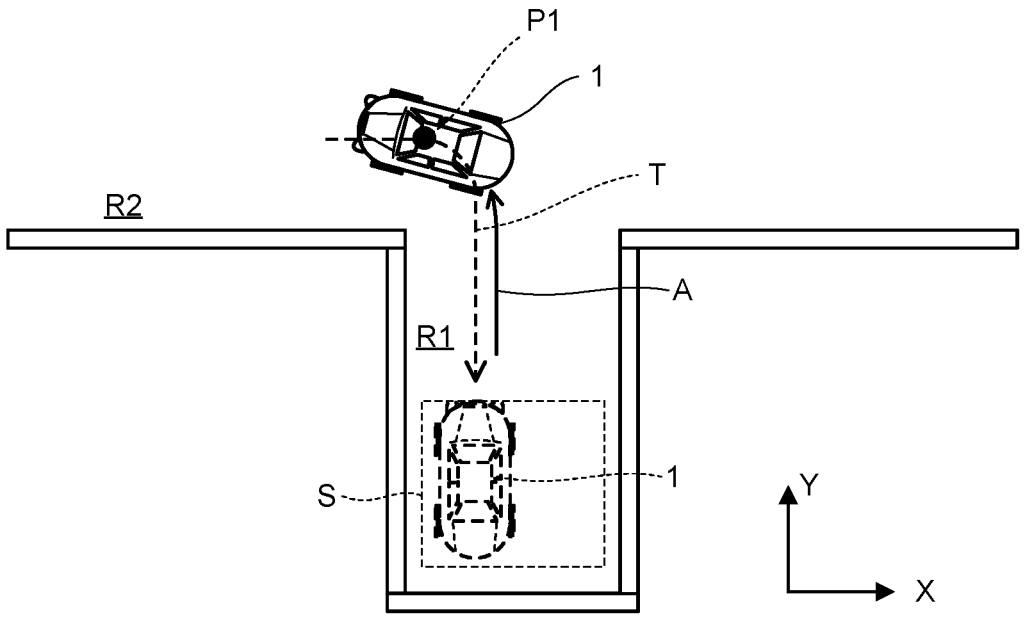
FIG. 3 is a diagram provided for describing an example in which the vehicle automatically returns to a predetermined position on the training route.

Here, for example, it is assumed that the predetermined position is position P1 on road R2 at which arrow T begins bending toward the − side in the Y direction. In this case, resumption controller 110 causes vehicle 1 to automatically return from a position, at which training traveling is completed, to position P1 on the first route in a traveling direction (arrow A), which is the direction opposite to arrow T, as illustrated in FIG. 3.

As the traveling control of vehicle 1, publicly known control is applicable such as, for example, control such as vehicle 1 is caused to perform reverse-traveling on the first route in the training traveling to return to the predetermined position.

Thus, the user can resume the training traveling from predetermined position P1.

Then, resumption controller 110 resumes control such that the training traveling resumed from the predetermined position is stored in a storer or the like.

Decider 120 determines, as the training route, a route that includes a route before a predetermined position on the first route and the second route in training traveling having been resumed.

The training route to be determined may be, for example, a route in which a route before a predetermined position on the first route and the second route in training traveling having been resumed are combined.

Figure 4:
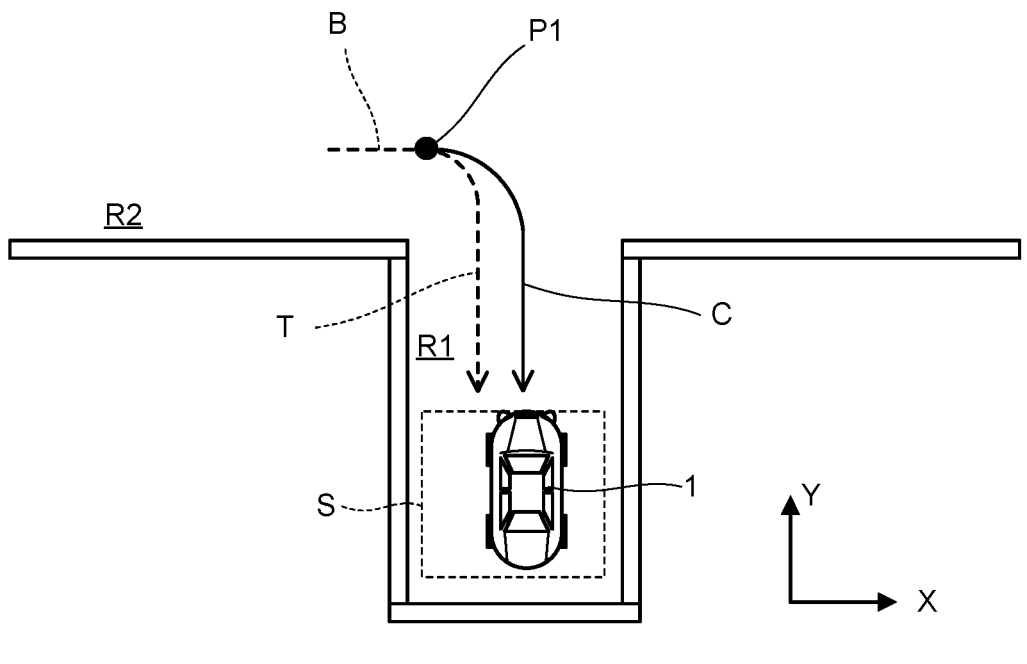
FIG. 4 is a diagram provided for describing an example in which the vehicle resumes training traveling from the predetermined position.

For example, it is assumed as illustrated in FIG. 4 that training traveling is resumed from position P1 on the first route of arrow T, and that the training traveling having been resumed is performed through a route, such as arrow C, which deviates to the + side of arrow T in the X direction.

In this case, a route in which the route of arrow T before position P1 (the portion of reference sign B) and the route of arrow C are combined is determined as the training route.

Thus, it is possible to perform automatic parking control by using a training route in which a second route in training traveling having been resumed is reflected.

In a case where training traveling is stopped or interrupted, command outputter 130 outputs a command to ask the user whether the training traveling is performed again. This command is outputted to, for example, display 20. In display 20, for example, a display such as "IS TRAINING TRAVELING PERFORMED AGAIN?" is outputted.

Here, in a case where the user performs an input for accepting the asking, such as "YES" to operation inputter 30, command outputter 130 outputs a command to cause the user to select a predetermined position. For example, command outputter 130 causes display 20 to display a first route in training traveling, and causes superimposed display of a plurality of candidate positions for the resumption position of the training traveling to be performed on the first route. Note that, not only a plurality of candidate positions, but also one candidate position may be displayed for resumption of training traveling.

Figure 5:
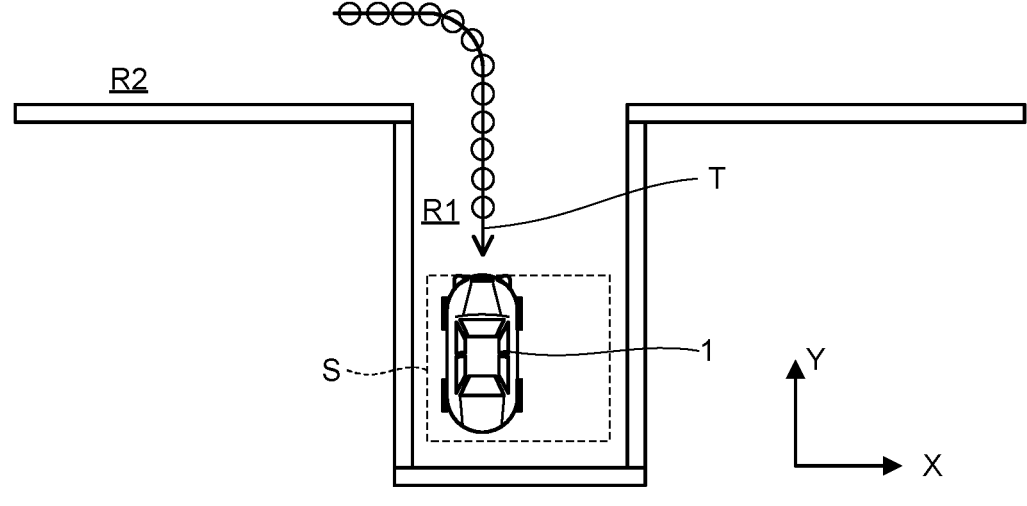
FIG. 5 illustrates a display example of a candidate position for a resumption position on the training route.

For example, as illustrated in FIG. 5, display 20 is caused to perform superimposed display of white circles indicating a plurality of candidate positions on arrow T which is the first route.

When the user selects one of a plurality of candidate positions via operation inputter 30, resumption controller 110 causes vehicle 1 to return to a predetermined position.

Further, for example, in a case where display 20 and operation inputter 30 form a touch screen, the selection operation of the user may be an operation in which the user touches a candidate position corresponding to a predetermined position. Further, for example, in a case where operation inputter 30 is a jog dial, the selection operation of the user may be an operation of selecting a candidate position corresponding to a predetermined position by turning the jog dial. Further, for example, in a case where operation inputter 30 includes an operation key, the selection operation of the user may be an operation of selecting a candidate position corresponding to a predetermined position by operating the key.

Thereby, it is possible to resume training traveling from a position desired by the user, and thus, it is possible to easily generate a training route desired by the user.

Figure 6:
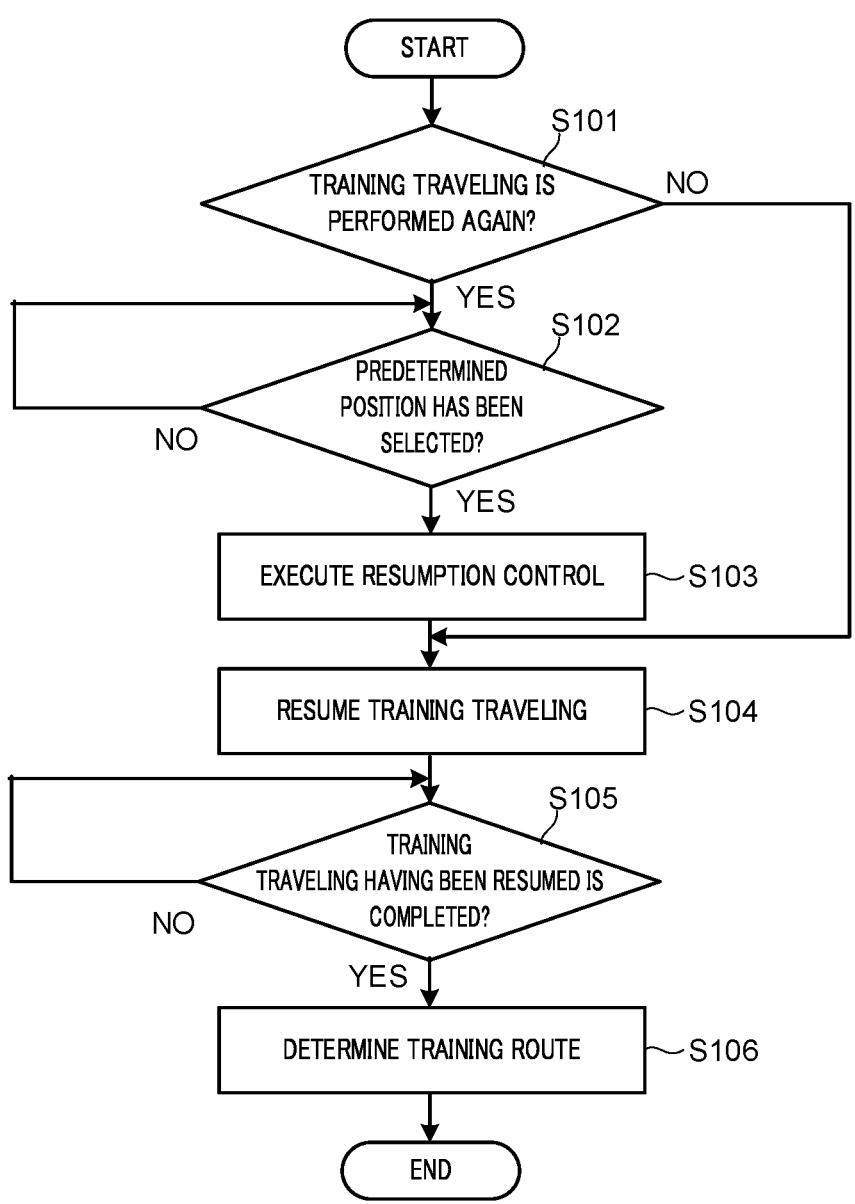
FIG. 6 is a flowchart illustrating an operation example of control during training traveling in the parking assistance apparatus.

Next, an operation of parking assistance apparatus 100 will be described. FIG. 6 is a flowchart illustrating an operation example of control during the training traveling in parking assistance apparatus 100. The processing in FIG. 6 is executed, for example, by the training traveling being stopping or interrupted.

Parking assistance apparatus 100 determines whether training traveling is performed again (step S101). For example, in a case where the user inputs an instruction of performing the training traveling again in the asking as to whether the training traveling is performed again, it is determined in step S101 that the training traveling is performed again. In a case where the user inputs a rejection of performing the training traveling again, on the other hand, it is determined in step S101 that the training traveling is not performed again.

In a case where it is determined that the training traveling is not performed again as a result of the determination (step S101, NO), the processing transitions to step S104.

In a case where it is determined that the training traveling is performed again (step S101, YES), on the other hand, parking assistance apparatus 100 determines whether a predetermined position has been selected (step S102).

In a case where a predetermined position has not been selected as a result of the determination (step S102, NO), the processing in step S102 is repeated.

In a case where a predetermined position has been selected (step S102, YES), on the other hand, parking assistance apparatus 100 executes resumption control such that vehicle 1 automatically returns to the predetermined position (step S103). Then, after vehicle 1 moves to the predetermined position, parking assistance apparatus 100 causes the training traveling to be resumed (step S104). For example, in step S104, the operation of the user of storing the training traveling is resumed.

Further, in this case, command outputter 130 may perform an output for asking whether the training traveling is resumed. Then, in a case where the user accepts this asking, the processing in step S104 in which the training traveling is resumed may be executed. Further, in a case where the user rejects this asking, this control may end.

Next, parking assistance apparatus 100 determines whether the training traveling having been resumed has ended (step S105). When the training traveling has not ended as a result of the determination (step S105, NO), the processing repeats the processing in step S105.

In a case where the training traveling having been resumed has ended (step S105, YES), on the other hand, parking assistance apparatus 100 determines, as the training route, a route in which a route before a predetermined position in a first route and a second route in the training traveling having been resumed are combined (step S106).

Further, in this case, command outputter 130 may perform an output for asking whether the route in which the route before the predetermined position on the first route and the second route in the training traveling having been resumed are combined is stored as the training route. Then, in a case where the user instructs in response to this asking that the route is stored, the processing in step S106 in which the training route is determined may be executed. Further, in a case where the user rejects this asking, parking assistance apparatus 100 may terminate this control.

After step S106, this control ends.

According to the present embodiment configured as described above, training traveling can be resumed by returning to a predetermined position on a route where the training traveling has been performed.

Figure 7:
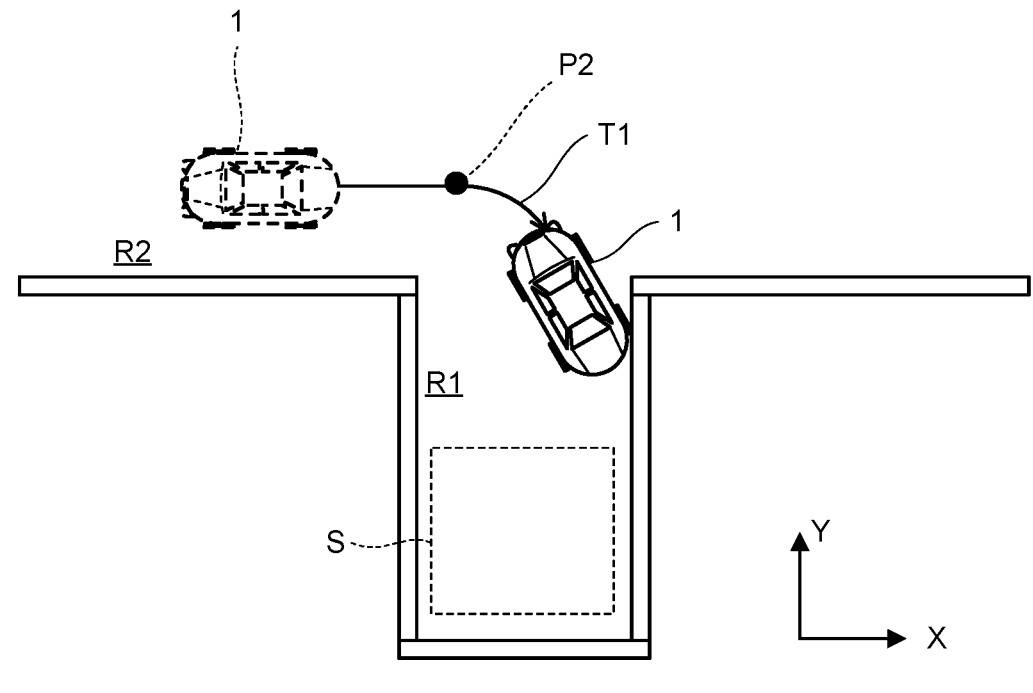
FIG. 7 illustrates an example of the training route when the training traveling is interrupted.

For example, it is assumed as illustrated in FIG. 7 that training traveling fails when the training traveling is performed. FIG. 7 indicates an example in which when vehicle 1 in training traveling turns from road R2 extending in the X direction to road R1 extending in the Y direction, vehicle 1 reaches the vicinity of the end part of road R1 on the + side in the X direction and the training traveling is interrupted.

Figure 8:
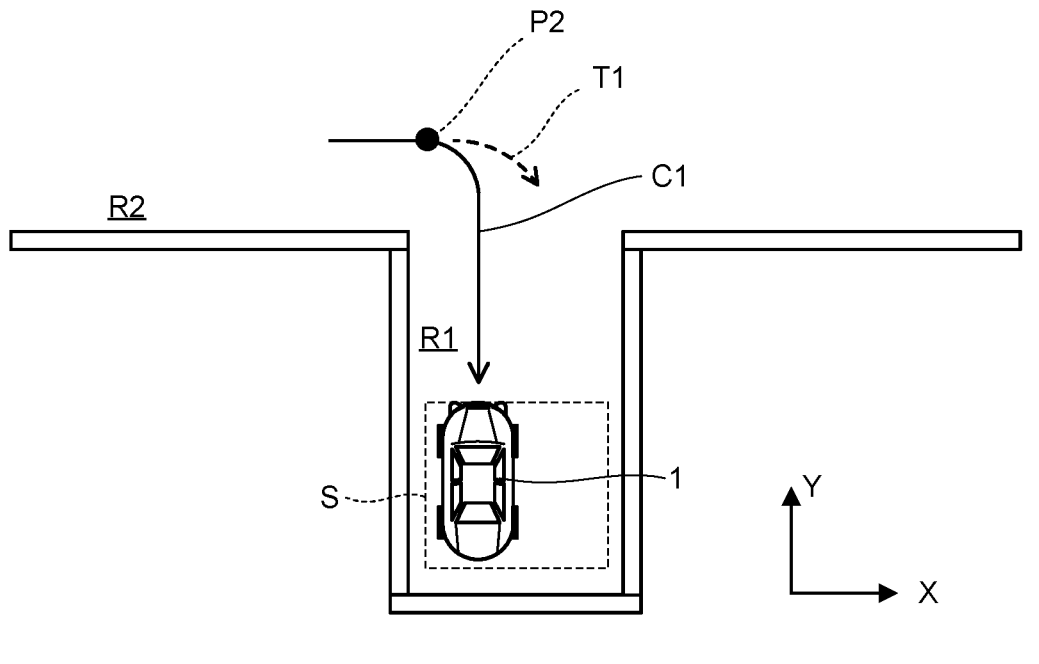
FIG. 8 illustrates an example of a route in the training traveling having been resumed.

In such a case, parking assistance apparatus 100 can return vehicle 1 to position P2 on arrow T1, which is the route in the training traveling, and cause the training traveling to be resumed from position P2 described above. As a result, the route in the training traveling having been resumed (see arrow C1) can be the training route as illustrated in FIG. 8.

That is, in the present embodiment, even in a case where training traveling has a portion in which the training traveling does not work, there is no need to perform the training traveling again from the start position and it is possible to resume the training traveling from the middle of the original route, and thus, it is possible to improve convenience in parking assistance.

Further, since the traveling of vehicle 1 is controlled such that vehicle 1 automatically returns to a predetermined position, it is possible to save the user a trouble to perform processing of returning vehicle 1 to the predetermined position. Further, since the operation state of vehicle 1 at the predetermined position, or the like can be accurately reproduced by automatic return of vehicle 1, it is possible to accurately resume the training traveling from the continuation of the original training route (first route).

Further, since the user is caused to select a predetermined position, it is possible to easily cause a training route to be along the intention of the user.

Note that, in the embodiment described above, a case where training traveling is re-performed again in training traveling having been resumed has not been mentioned, but the present disclosure is not limited thereto. For example, in a case where training traveling is resumed and then the training traveling having been resumed is stopped or interrupted, resumption controller 110 may re-resume the training traveling from a second predetermined position.

The second predetermined position may be an arbitrary position after P1 on the second route in FIG. 4 (the route of arrow C), may be the position of P1 on the first route in FIG. 4, or may be a position after P1 on the first route.

Then, decider 120 may determine, as the training route, a route including a route before the second predetermined position and a third route in training traveling that has been re-resumed.

Figure 9:
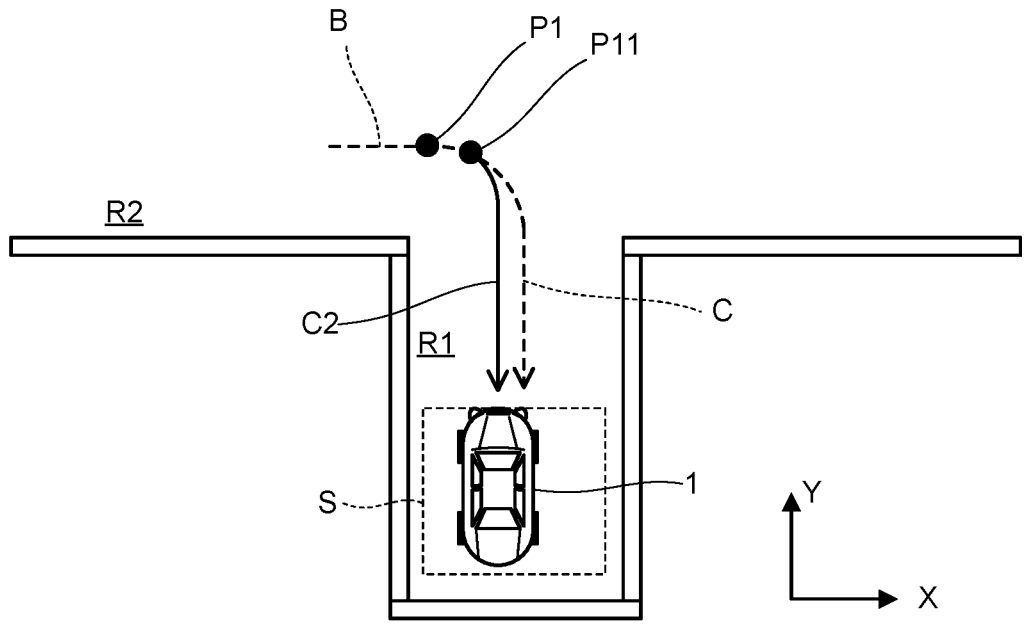
FIG. 9 illustrates an example of a route in the training traveling that has been re-resumed.

For example, it is assumed that training traveling is stopped on the training route after the resumption in FIG. 4 (the route of arrow C). In this case, for example, it is assumed that the user considers wishing to cause the position of vehicle 1 to be a position that slightly deviates from the position of vehicle 1 illustrated in FIG. 4 toward the − side in the X direction. In this case, for example, as illustrated in FIG. 9, the training traveling is re-resumed at position P11 on the route of arrow C, vehicle 1 enters the parking space to a position desired by the user with the route of arrow C2 (third route), and this route of arrow C2 can be determined as the training route.

The flow in this control may be such that, for example, in the flowchart illustrated in FIG. 6, the processing in step S101 is performed after "YES" is determined in the processing in step S105, that in a case where the result in step S101 is "YES", the processing in step S102 and thereafter is performed, and that in a case where the result in step S101 is "NO", the processing in step S106 is performed.

According to such a configuration, even in a case where the user wishes to perform training traveling, which has been resumed, again, the user can re-resume the training traveling, and thus, the user can park vehicle 1 at a position desired by the user.

Further, in the embodiment described above, every course after a predetermined position on a training route is the second route in training traveling having been resumed, the present disclosure is not limited thereto. For example, a portion of a route after a predetermined position on a training route may be the second route in the training route after the resumption.

That is, in a case where the second route in training traveling having been resumed is mergeable into the first route in the training traveling before the resumption, decider 120 determines, as the training route, a route obtained by replacing a route between a predetermined position on the first route and a merging position on the first route with the second route, where the merging position is a merging position at which the first route merges into the second route.

Figure 10:
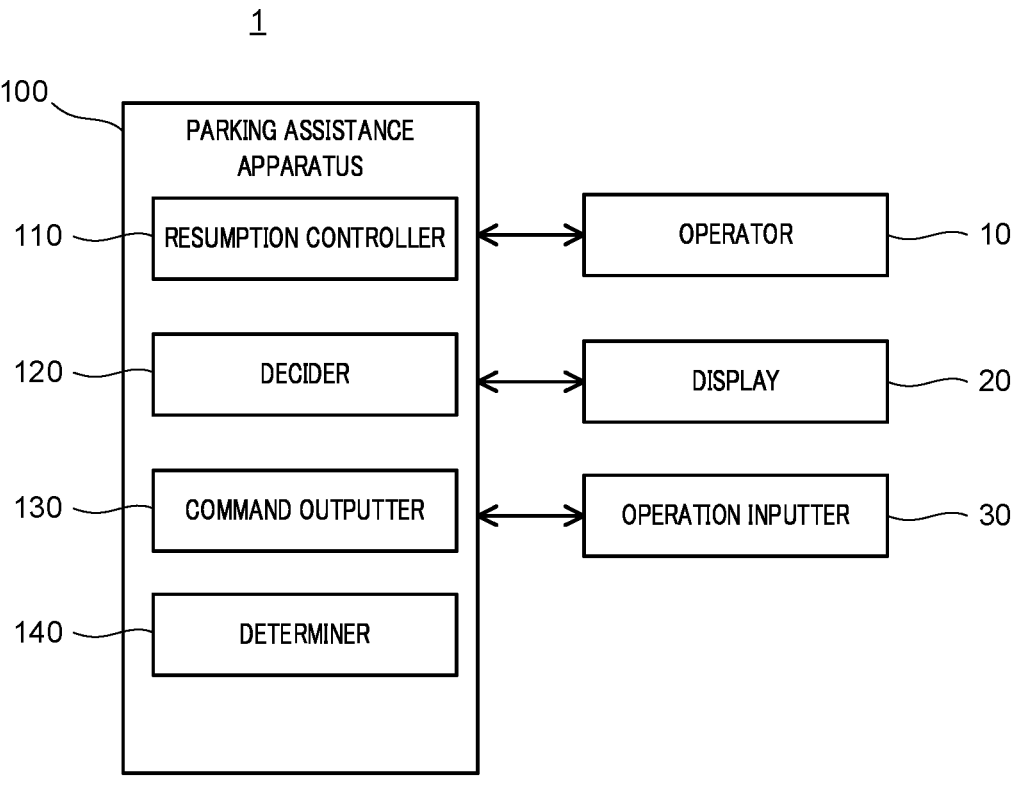
FIG. 10 is a block diagram illustrating a configuration of a vehicle to which a parking assistance apparatus according to a variation is applied.

In the case of such a configuration, as illustrated in FIG. 10, parking assistance apparatus 100 further includes determiner 140 that determines whether the second route is mergeable into the first route.

For example, in a case where a distance between the position of vehicle 1 during training traveling having been resumed and a route in the training traveling before the resumption is less than a first threshold value, a difference in azimuth therebetween is less than a second threshold value, and the traveling direction of vehicle 1 is the same as the traveling direction of the training traveling before the resumption (for example, forward movement or rearward movement), determiner 140 determines that second route is mergeable into the first route.

The first threshold value is an arbitrarily configurable value and is appropriately configured as, for example, a relatively small value (distance) that allows vehicle 1 during training traveling having been resumed to reliably merge into a route in the training traveling before the resumption, based on the operation state or the like.

The second threshold value is an arbitrarily configurable value and is appropriately configured as, for example, a relatively small value that allows the azimuth of vehicle 1 in training traveling having been resumed to be identical, when vehicle 1 merges into a route in the training traveling before the resumption, to the azimuth of vehicle 1 at a merging position on the route.

Note that, in a case where the distance between the position of vehicle 1 during the training traveling having been resumed and the route in the training traveling before the resumption is less than the first threshold value, determiner 140 may determine that the second route is mergeable into the first route. Alternatively, in a case where the distance between the position of vehicle 1 during the training traveling having been resumed and the route in the training traveling before the resumption is less than the first threshold value and the difference in azimuth therebetween is less than the second threshold value, determiner 140 may determine that the second route is mergeable into the first route.

In a case where determiner 140 determines that the second route is mergeable into the first route, decider 120 determines, as the training route, a route obtained by replacing a route between a predetermined position on the first route and a merging position on the first route with the second route, where the merging position is a merging position at which the first route merges into the second route.

For example, it is assumed that when training traveling is first performed, an entry into a parking space is performed on a route where an obstacle is avoided, and this route is determined as the training route.

Figure 11:
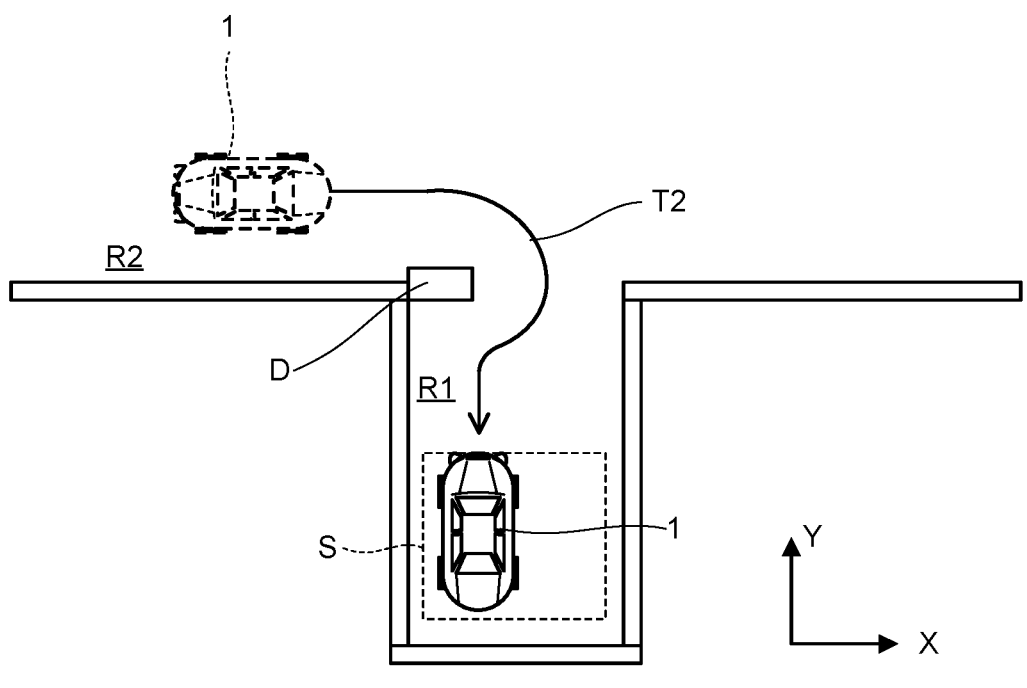
FIG. 11 illustrates an example of a training route according to the variation.

FIG. 11 illustrates an example in which when training traveling is first performed, there is obstacle D in an end portion of road R1, which extends in the Y direction, on the − side in the X direction, where the parking space is located. Since vehicle 1 in training traveling avoids obstacle D when turning from road R2 extending in the X direction toward road R1, vehicle 1 enters the parking space, with a route (see arrow T2) which draws an orbit bulging on the + side in the X direction, and this route is the training route.

Figure 12:
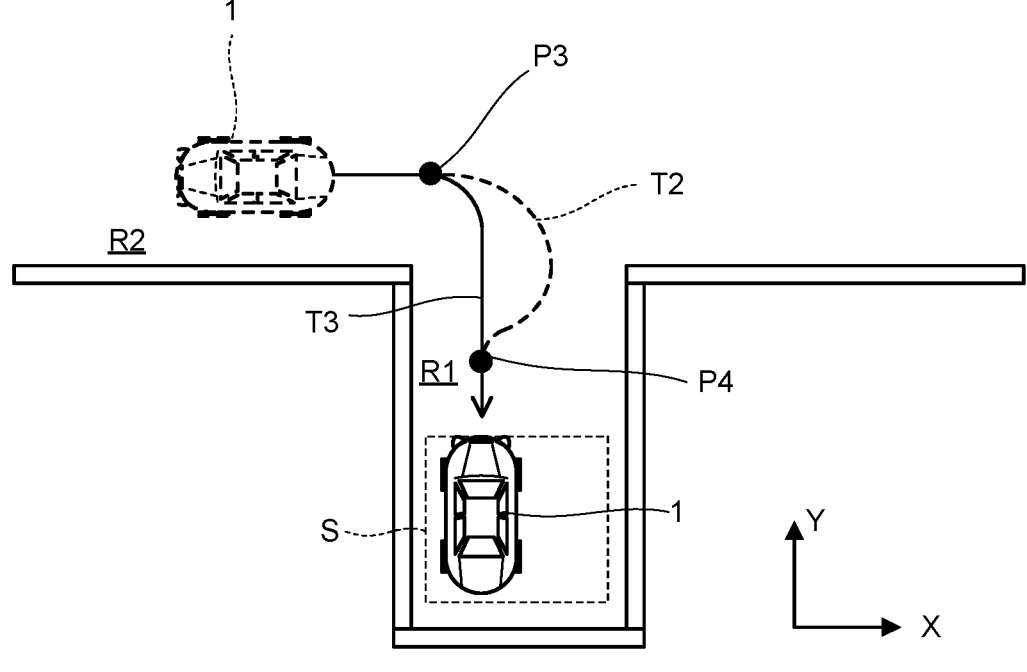
FIG. 12 is a diagram provided for describing an example in which the vehicle resumes training traveling from a predetermined position of the training route in FIG. 11.

Here, for example, it is assumed as illustrated in FIG. 12 that in a case where obstacle D is removed, the portion bulging on the + side in the X direction in the training route is not a smooth traveling route when there is no obstacle D, and thus, the user wishes to correct the bulging portion.

Accordingly, for example, it is assumed that the training traveling is resumed from position P3 at which vehicle 1 begins bending toward road R1 extending in the Y direction, vehicle 1 travels through a traveling route not bulging on the + side in the X direction (see arrow T3), and vehicle 1 enters road R1. Then, it is assumed that vehicle 1 moves to the − side in the Y direction toward the parking space, and training traveling is performed at position P4 in front of the parking space such that vehicle 1 merges into the training route before the resumption.

In this case, for example, determiner 140 determines that the traveling route not bulging on the + side in the X direction is mergeable into the training route before the resumption at a merging position thereof before vehicle 1 reaches the merging position.

Then, a route in which only the portion bulging on the + side in the X direction in the training route before the resumption is replaced with the second route is determined as the training route.

Thus, for example, since it is sufficient to update only a replaced route in the storer that stores a training route, it is possible to simplify the updating operation of the storer.

Figure 13:
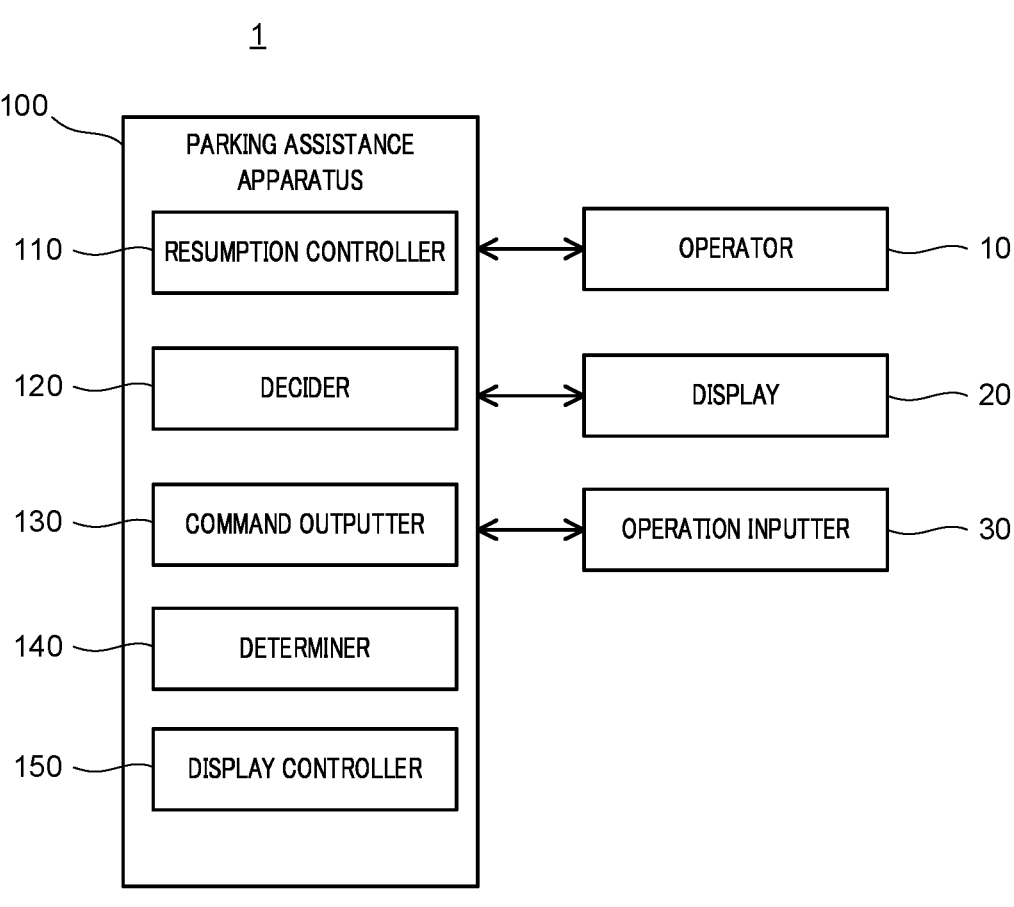
FIG. 13 is a block diagram illustrating a configuration of a vehicle to which a parking assistance apparatus according to a variation is applied.

Further, although no particular mention of a display of a route to be traveled in training traveling on display 20 has been made in the embodiment described above, the present disclosure is not limited thereto. For example, as illustrated in FIG. 13, display controller 150 that displays a route to be traveled by vehicle 1 in training traveling on the display medium may be further provided.

Further, in a case where display controller 150 is provided in the configuration including determiner 140 described above, display controller 150 may change a display aspect of the display medium (display 20) between a timing before vehicle 1 reaches a portion of the first route and a timing after vehicle 1 reaches the portion, where the portion is a portion into which vehicle 1 is mergeable in training traveling having been resumed.

Figure 14:
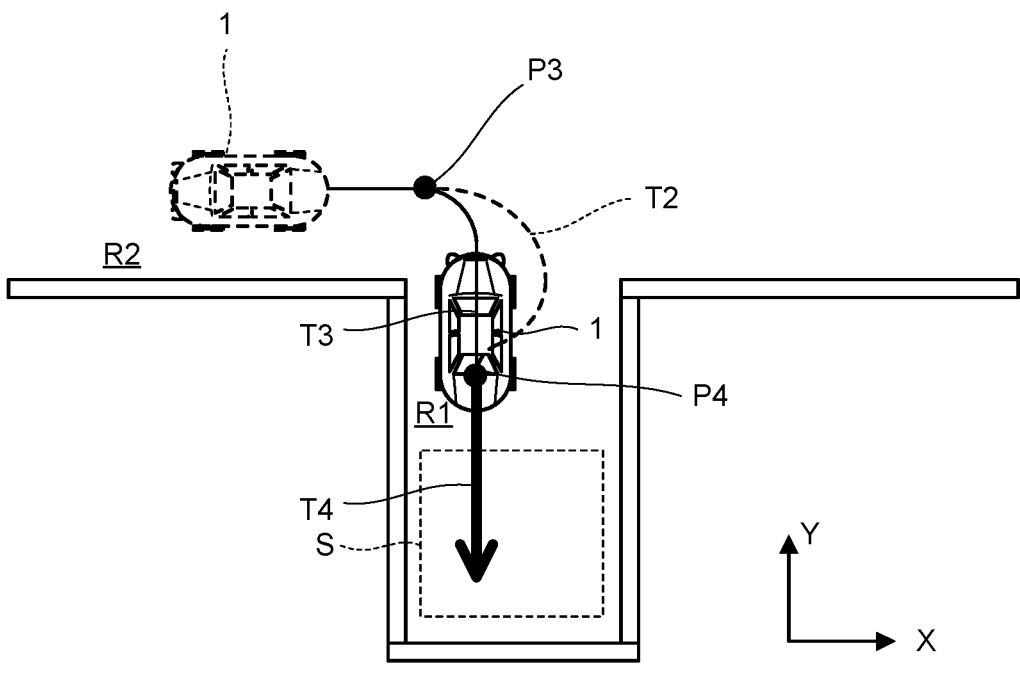
FIG. 14 illustrates a display example of an assist route.

For example, as illustrated in FIG. 14, display controller 150 may cause display 20 to display the original route after the merging position (the training route before the resumption) in training traveling having been resumed as an assist route (see arrow T4).

Thus, since it is easier for the user to grasp what the original route (the training route before the resumption) is like, a return to the original route can be easily performed.

Figure 15:
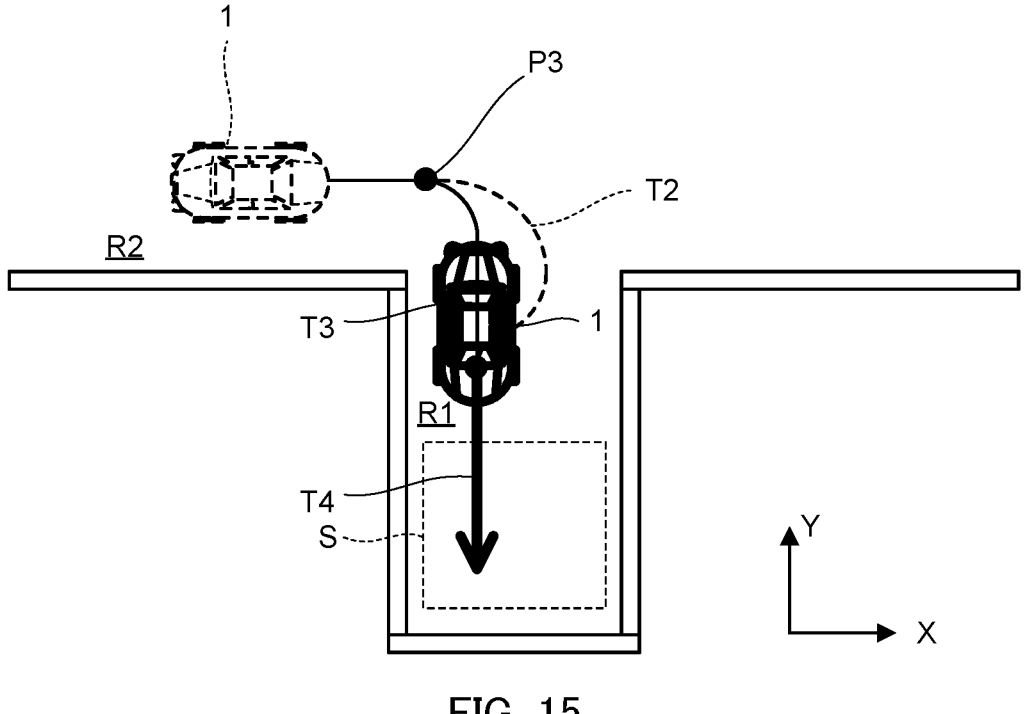
FIG. 15 illustrates a modification example of a display aspect of the vehicle.

Further, when the assist route is displayed on display 20, display controller 150 may change the display color of vehicle 1 on display 20 from that prior to the display of the assist route. FIG. 15 illustrates an example in which emphasized display of vehicle 1 is performed.

Thus, since it is easier for the user to recognize that the display aspect of display 20 has changed, it is possible to easily cause the user to notice that the assist route is displayed.

Figure 16:
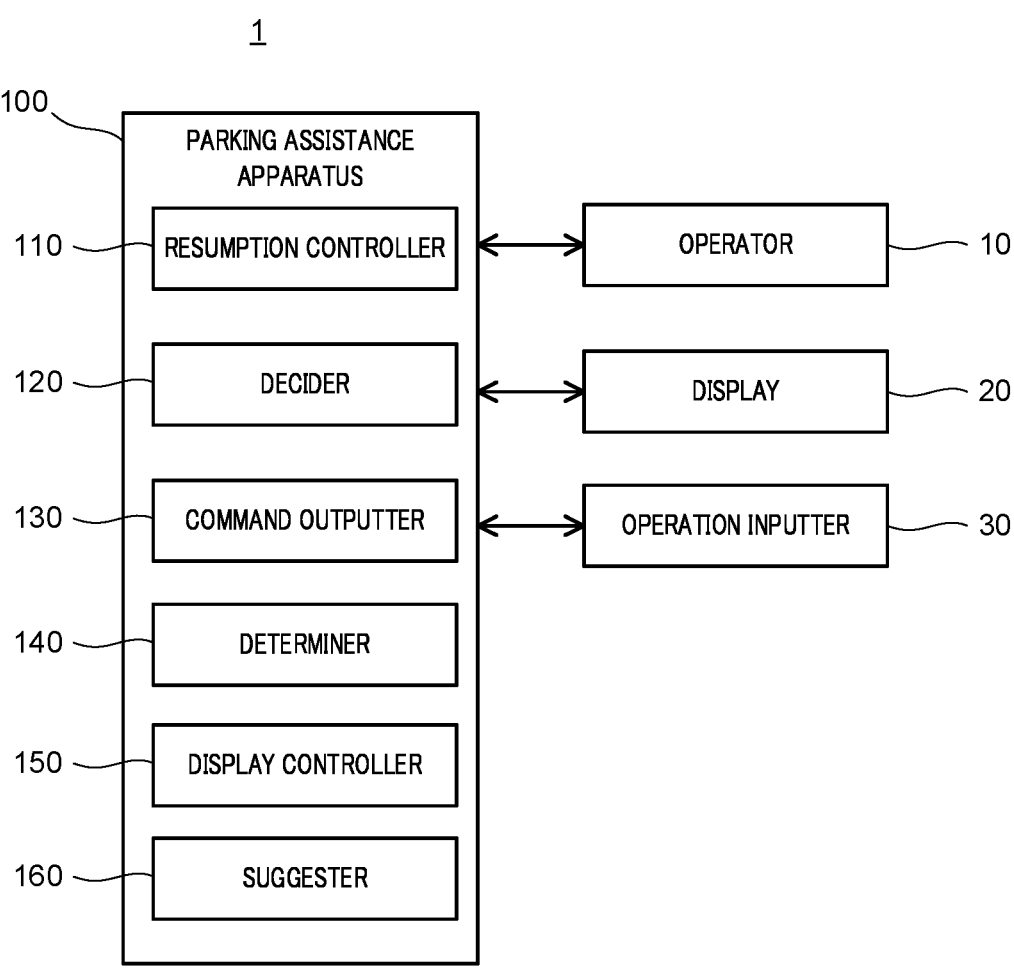
FIG. 16 is a block diagram illustrating a configuration example of a vehicle to which a parking assistance apparatus according to a variation is applied.

Further, in the embodiment described above, the control of resumption controller 110 is performed when the user stops or interrupts training traveling, but the present disclosure is not limited thereto. For example, as illustrated in FIG. 16, parking assistance apparatus 100 may further include suggester 160 that suggests to the user that training traveling is resumed at a predetermined position during training traveling by the user.

Suggester 160 suggests resumption of training traveling at a predetermined position to the user in a case where a predetermined condition is satisfied, for example, in a case where the operation amount of operator 10 by the user (for example, the number of times of turning the steering wheel, or the like) is greater than a predetermined amount, in a case where the radius of curvature of an orbit when vehicle 1 turns toward a position in a parking space is smaller than a predetermined value, in a case where a distance between vehicle 1 and an obstacle in the periphery of a road at a parking space is smaller than a predetermined distance, in a case where the number of times of turning the steering wheel is greater than a predetermined number of times, or the like.

The suggestion method to the user may include a method of notifying the user of information for urging resumption of training traveling at a predetermined position, or the like, by a display on display 20, a sound output, or the like.

Thus, since it is possible to give an opportunity to perform training traveling again to the user, it is possible to contribute to generation of a better training route.

Further, although vehicle 1 is caused to automatically return to the predetermined position in the embodiment described above, the present disclosure is not limited thereto, and the user may manually return vehicle 1 to the predetermined position. Further, after the user manually returns vehicle 1 to the predetermined position, resumption controller 110 resumes storing training traveling having been resumed in the storer, or the like.

Further, although the user selects the predetermined position in the embodiment described above, the present disclosure is not limited thereto. For example, parking assistance apparatus 100 may select the predetermined position, or an apparatus other than parking assistance apparatus 100 may select the predetermined position.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2022-150166, filed on Sep. 21, 2022, the disclosure of which including the specification, drawings and abstract is incorporated herein by reference in its entirety.

INDUSTRIAL APPLICABILITY

The parking assistance apparatus of the present disclosure is useful as a parking assistance apparatus and a parking assistance method each capable of improving convenience in parking assistance.

The invention claimed is:

1. A parking assistance apparatus that performs parking assistance based on a route of a vehicle in training traveling, the parking assistance apparatus comprising a processor that causes the training traveling to be resumed from a predetermined position on a first route in the training traveling, wherein the processor determines, as a training route, a route including a route before the predetermined position on the first route and a second route in the training traveling having been resumed, the processor controls traveling of the vehicle such that the vehicle on the first route automatically returns to the predetermined position, after the processor causes the training traveling to be resumed, the processor causes the training traveling to be re-resumed from a second predetermined position on one of the first route and the second route, and the processor further determines, as the training route, a route including a route before the second predetermined position and a third route in the training traveling having been re-resumed.

2. The parking assistance apparatus according to claim 1, wherein in a case where the second route is mergeable into the first route, the processor determines, as the training route, a route obtained by replacing a route between the predetermined position on the first route and a merging position on the first route with the second route, the merging position being a merging position at which the first route merges into the second route.

3. The parking assistance apparatus according to claim 2, wherein the processor determines whether the second route is mergeable into the first route.

4. The parking assistance apparatus according to claim 2, wherein:

the processor causes a route to be traveled by the vehicle to be displayed on a display medium, the display medium capable of displaying the route to be traveled by the vehicle, and the processor changes a display aspect of the display medium between a timing before the vehicle reaches a mergeable portion of the first route in the training traveling having been resumed and a timing after the vehicle reaches the mergeable portion in the training traveling having been resumed.

5. The parking assistance apparatus according to claim 1, wherein the processor outputs a command to cause a user to select the predetermined position.

6. The parking assistance apparatus according to claim 1, wherein the processor causes the first route to be displayed and causes superimposed output to be performed on the first route, the superimposed output being superimposed output of a candidate position for resumption of the training traveling.

7. The parking assistance apparatus according to claim 1, wherein the processor suggests to a user that the training traveling is resumed at the predetermined position during the training traveling.

8. A parking assistance method in which parking assistance is performed based on a route of a vehicle in training traveling, the parking assistance method comprising:

resuming the training traveling from a predetermined position on a first route in the training traveling, the resuming of the training traveling including controlling traveling of the vehicle such that the vehicle on the first route automatically returns to the predetermined position;

determining, as a training route, a route including a route before the predetermined position on the first route and a second route in the training traveling having been resumed; and after the resuming of the training traveling, re-resuming the training traveling from a second predetermined position on one of the first route and the second route, wherein the determining includes determining, as the training route, a route including a route before the second predetermined position and a third route in the training traveling having been re-resumed.

9. The parking assistance method according to claim 8, wherein the determining includes, in a case where the second route is mergeable into the first route, determining, as the training route, a route obtained by replacing a route between the predetermined position on the first route and a merging position on the first route with the second route, the merging position being a merging position at which the first route merges into the second route.

10. The parking assistance method according to claim 9, further comprising determining whether the second route is mergeable into the first route.

11. The parking assistance method according to claim 9, further comprising displaying a route to be traveled by the vehicle on a display medium, the display medium capable of displaying the route to be traveled by the vehicle, wherein in the displaying, changing a display aspect of the display medium between a timing before the vehicle reaches a mergeable portion of the first route in the training traveling having been resumed and a timing after the vehicle reaches the mergeable portion in the training traveling having been resumed.

12. The parking assistance method according to claim 8, further comprising outputting a command to cause a user to select the predetermined position.

13. The parking assistance method according to claim 8, further comprising displaying the first route and performing superimposed output on the first route, the superimposed output being superimposed output of a candidate position for resumption of the training traveling.

14. The parking assistance method according to claim 8, further comprising suggesting to a user that the training traveling is resumed at the predetermined position during the training traveling.

* * * * *